R. CONRADER.

MACHINE FOR GRINDING SPHERICAL OR OTHER CURVED SURFACES.

No. 11,593. Reissued Mar. 23, 1897.

Witnesses:

Alex. Scott

Daniel W. Edelin.

Inventor:

Rudolph Conrader by his Atty

J. N. McIntire

UNITED STATES PATENT OFFICE.

RUDOLPH CONRADER, OF ERIE, PENNSYLVANIA, ASSIGNOR TO THE BRUNSWICK-BALKE-COLLENDER COMPANY, OF OHIO.

MACHINE FOR GRINDING SPHERICAL OR OTHER CURVED SURFACES.

SPECIFICATION forming part of Reissued Letters Patent No. 11,593, dated March 23, 1897.

Original No. 513,632, dated January 30, 1894. Application for reissue filed January 30, 1896. Serial No. 577,464.

*To all whom it may concern:*

Be it known that I, RUDOLPH CONRADER, a citizen of the United States, residing at Erie, in the county of Erie and State of Pennsylvania, have invented certain new and useful Improvements in Machines for Grinding Spherical or other Curved Surfaces; and I do hereby declare the following to be a full, clear, and exact description of the invention, reference being had to the annexed drawings, which form part of this specification.

My invention consists in the improvements in machines for grinding spherical and other curved surfaces hereinafter fully described, and illustrated in the accompanying drawings, and most particularly pointed out in the claims of this specification.

Figure 1:
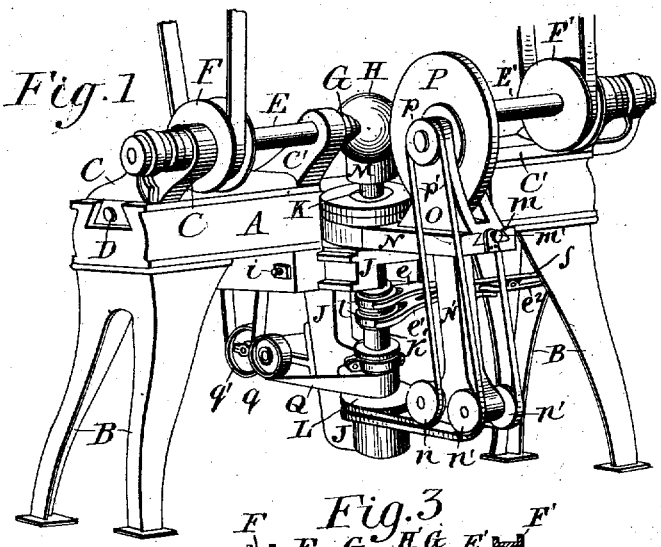
Figure 3:
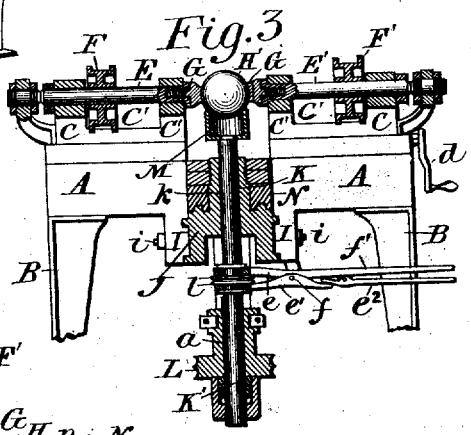
Figure 2:
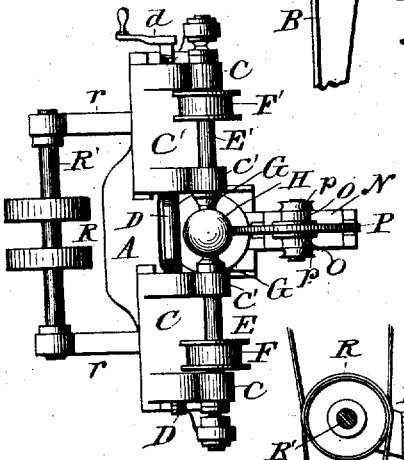
Figure 5:
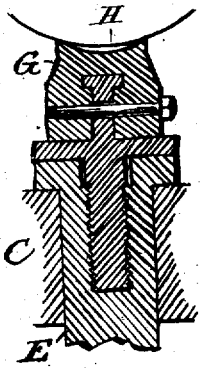
Figure 4:
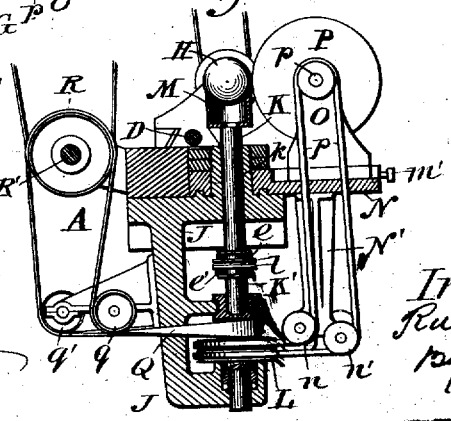

Figure 1 is a perspective view of my improved machine for grinding and polishing spherical and other curved surfaces. Fig. 2 is a top or plan view of the same. Fig. 3 is a vertical longitudinal section of the same. Fig. 4 is a vertical transverse section of the same. Fig. 5 is a detail view of a section of one of the ball-chucks of my machine.

In the construction shown in the drawings of my improved machine for grinding and polishing spherical and other curved surfaces, A is the bed of the machine-frame, and B B the legs thereof.

Upon the ends of the bed A are mounted carriages C and C′, which carriages slide horizontally in gibs or ways on the bed A toward and from each other, they being actuated by means of a shaft D, one end of which is provided with a right-hand screw-thread and the other end with a left-hand screw-thread, one of these screw-threads engaging with a nut on the carriage C and the other with a nut on the carriage C′, so that the rotation of the screw-shaft D by means of the crank *d* thereon operates to move the carriages C and C′ simultaneously toward or from each other at a uniform speed, according to the direction the screw-shaft D is rotated.

In the bearings *c* and *c′* on the carriages C and C′, I mount shafts E and E′, in line with each other, which shafts are provided with driving-pulleys F and F′, and on the inner ends of the shafts E and E′, I secure ball-chucks G, adapted to clamp a ball H between them, as and for the purpose hereinafter set forth. These chucks G are made laterally adjustable, so that their centers may be moved out of line with the centers of the shafts E and E′, so as to center the ball to one side of the centers of the said shafts, for the purpose of so holding the ball that a depression on one side thereof may be ground out without cutting away the opposite side of the ball to any great degree, so that when the depression is removed and the ball again finished it will be only reduced in diameter to the extent of the depth of the depression removed from the side thereof.

The center part of the bed A is cut away at the front side thereof, and transverse guides I I are secured to the lower side of the bed A, in which are mounted a transversely-sliding carriage J, adapted to be adjusted transversely in said guides I I, as desired, and secured at any point by means of set-screws *i i*.

In the carriage J is mounted a vertical shaft consisting of an upper section K and a lower section K′, this shaft being directly beneath the point where the chucks G G on the ends of the shafts E and E′ would meet if brought together. The upper section K of this vertical shaft is mounted in a long sleeve-bearing *k* in the upper part of the carriage J and the lower section K′ in bearings in the lower part of the carriage J, and is connected with a driving-pulley L by means of an ordinary spline and groove *a*, so that the shaft-section K′ is adapted to be moved vertically in the pulley L, and on the lower end of the upper shaft-section K and on the upper end of the lower shaft-section K′ are friction collars and plates *l l*, and in grooves in these collars the ends of levers *e* and *e′* operate, these levers being pivoted to the machine-frame at *f*, the lever *e* operating in a groove in the collar *l* on the lower end of the upper section K, so that when the outer end thereof is pressed downward the upper section K is lifted up off of the end of the lower section K′.

To the outer end *f′* of the lever *e* is pivoted short lever $e^2$, which engages with the outer end of the lever *e′*, the inner end of which engages with a groove in the collar *l* on the upper end of the lower shaft-section K′, so that when the outer ends of the levers *e* and $e^2$ are brought together the friction-plates *l l* are also forced together, so that the upper shaft-section K is rotated by means of the frictional contac of the plates *l l*. This operates to rotate a cup-shaped tool M on the upper end of the upper shaft-section K against a ball H, held between the ball-chucks G G. This cup-shaped tool M, I make either in the form of a cutting-tool, a grinding-tool, or a polishing-tool, as desired, said tools M being interchangeable on the shaft K.

On the carriage J, and pivoted around the sleeve-shaped shaft-bearing *k*, is an arm N, adapted to swing around a central point, the center of which is the center of the vertical shaft K. From this arm N an arm N′ projects downward to a point opposite the driving-pulley L on the lower shaft-section K′, where it is provided with bearings in which small idler-pulleys *n n′* operate, as and for the purpose hereinafter set forth.

On the arm N is mounted a carriage O, adapted to be moved in and out on gibs or ways *m* in the arm N by means of an adjusting-screw *m′*.

In bearings on the carriage O is mounted an emery-wheel P, the shaft of which is provided with driving-pulleys *p*, from which driving-belts *p′* pass down around the idler-pulleys *n n′* to and around the vertical driving-pulley L, which pulley is in turn driven by a belt Q, passing around idlers *q q′* to and around a driving-pulley R on a shaft R′, mounted in bearings *r r* at the back of the machine, to the shaft of which pulley power is supplied in any convenient manner. It will be observed that by this arrangement the emery-wheel P can be continuously driven at any desired speed, the arm N supporting the same being at the same time adapted to be moved around the axis *k* thereof, so that the emery-wheel P travels in a semicircular path around the ball H, between and rotated by the chucks G G.

In operation the rough ball is first clamped between the chucks G G and the major portion thereof ground into shape. The ball is then reversed and clamped by its opposite sides, and the portions which were first occupied by the chucks G G are then ground to shape, and finally the ball is polished by means of a rotating polishing-tool M, held up against it as it is rotated and operated as hereinbefore described.

Having thus fully described my invention, so as to enable others to construct and operate the same, what I claim as new, and desire to secure by Letters Patent of the United States, is—

1. In a machine for grinding and polishing spherical surfaces, the combination, with the shafts E, and E′, having ball-chucks thereon, of the vertically-adjustable, revoluble, shaft, having a cup-shaped polishing-tool M, mounted on its upper end and adapted to operate upon a ball held between said chucks; the whole constructed, arranged and operating together in the manner and for the purposes hereinbefore set forth.

2. In a machine for grinding and polishing spherical surfaces, the combination, with a vertical shaft consisting of the sections K, and K′, the upper end of the section K being provided with a cup-shaped tool M, and the lower section K′ with a pulley secured thereto, by means of a spline, or groove, so that the shaft will move endwise therein, of friction-collars, or plates *l*, *l*, on the ends of said shaft; and levers *e*, and *e′*; all substantially as and for the purpose set forth.

3. In a machine for grinding and polishing spherical surfaces, the combination, of shafts E, E′, provided with chucks G, G, and adapted to be moved longitudinally toward, and from a meeting point; an arm N, which vibrates about an axis, vertically in line with said meeting point of said shafts; a driving-pulley L the axis of motion of which coincides with that of said arm; a grinder-wheel P, provided with a suitable pulley; idler-pulleys *n n′*; and belts *p′*; the whole constructed and operating substantially as and for the purpose set forth.

4. In a ball grinding and polishing machine, the combination with the shafts, or spindles E, E′, and a grinding-wheel operating to cut in an arc the center of which lies in a line coincident with the axes of said shafts, of laterally-adjustable chucks G, G, on the adjacent ends of said shafts; the whole arranged to operate in the manner as and for the purpose set forth.

In testimony whereof I affix my signature in the presence of two witnesses.

RUDOLPH CONRADER.

Witnesses:

FRANK C. CANTOR,

C. B. HAYES.